United States Patent [19]
Ebrahim et al.

[11] Patent Number: 5,737,755
[45] Date of Patent: Apr. 7, 1998

[54] SYSTEM LEVEL MECHANISM FOR INVALIDATING DATA STORED IN THE EXTERNAL CACHE OF A PROCESSOR IN A COMPUTER SYSTEM

[75] Inventors: Zahir Ebrahim, Mountain View; Satyanarayana Nishtala, Cupertino; William Van Loo, Palo Alto; Kevin Normoyle; Leslie Kohn, both of Mountain View; Louis F. Coffin, III, San Jose, all of Calif.

[73] Assignee: Sun Microsystems, Inc., Mountain View, Calif.

[21] Appl. No.: 797,995

[22] Filed: Feb. 12, 1997

Related U.S. Application Data

[63] Continuation of Ser. No. 414,365, Mar. 31, 1995.

[51] Int. Cl.$^6$ .................................................. G06F 13/00
[52] U.S. Cl. ................................... 711/141; 711/144
[58] Field of Search ............................. 395/464, 468, 395/471, 472, 473

[56] References Cited

U.S. PATENT DOCUMENTS

| | | | |
|---|---|---|---|
| 4,228,503 | 10/1980 | Waite et al. | 395/448 |
| 4,638,431 | 1/1987 | Nishimura | 395/471 |
| 5,036,459 | 7/1991 | den Haan et al. | 395/200.14 |
| 5,058,006 | 10/1991 | Durdan et al. | 395/449 |
| 5,193,170 | 3/1993 | Lam | 395/473 |
| 5,222,224 | 6/1993 | Flynn et al. | 395/471 |

(List continued on next page.)

FOREIGN PATENT DOCUMENTS

| | | | |
|---|---|---|---|
| 0 317 481 A3 | 11/1988 | European Pat. Off. | G06F 15/16 |
| 0 380 842 A2 | 6/1989 | European Pat. Off. | G06F 12/08 |
| A0380861 | 8/1990 | European Pat. Off. | |
| 0 468 831 A2 | 6/1991 | European Pat. Off. | G06F 12/08 |
| 0 507 571 | 4/1992 | European Pat. Off. | G06F 5/06 |
| A0489556 | 6/1992 | European Pat. Off. | |
| 0 537 899 A1 | 9/1992 | European Pat. Off. | G06F 9/46 |
| 0 598 535 A1 | 11/1993 | European Pat. Off. | G06F 12/08 |
| 0 644 489 A3 | 9/1994 | European Pat. Off. | G06F 9/46 |
| 0 640 923 A1 | 3/1995 | European Pat. Off. | |
| A0640923 | 3/1995 | European Pat. Off. | |
| 2200481 | 8/1988 | United Kingdom | |
| WO 93/00638 | 6/1992 | WIPO | G06F 13/00 |

OTHER PUBLICATIONS

IEEE 1992, A Second–Level Cache Controller for A Super–Scalar SPARC Processor, Sun Microsystems Computer Corporation, pp. 142–151.
IEEE Rochester's Intelligent Gateway, vol. 15, No. 10, Oct. 1982, pp. 54–68.
Microprocessors and Microsystems, vol. 16, 1992, No. 2, London, GB, pp. 81–89.
The Computer Society of the IEEE, 1987 IEEE International Conference On Computer Design: VLSI In Computers & Processors.
IEEE, Micro, vol. 14, No. 5, Oct. 1, 1994, pp. 52–29 Hardware Approaches to Cache Conference in Shared–Memory Multiprocessors, Part 1.

*Primary Examiner*—Tod R. Swann
*Assistant Examiner*—Conley B. King, Jr.
*Attorney, Agent, or Firm*—Blakely, Sokoloff Taylor & Zafman

[57] ABSTRACT

A computer system is disclosed including a memory subsystem and a processor subsystem having an external cache and an external mechanism for invalidating cached datablocks in the processor subsystem and for reducing false invalidation operations. The processor subsystem issues a write invalidate message to the memory subsystem that specifies a datablock and that includes an invalidate advisory indication that indicates whether the datablock is present in the external cache. The invalidate advisory indication determines whether the memory subsystem returns an invalidate message to the processor subsystem for the write invalidate operation.

9 Claims, 5 Drawing Sheets

U.S. PATENT DOCUMENTS

| | | | |
|---|---|---|---|
| 5,226,146 | 7/1993 | Milia et al. | 395/468 |
| 5,249,284 | 9/1993 | Kass et al. | 395/468 |
| 5,251,311 | 10/1993 | Kasai | 395/471 |
| 5,257,361 | 10/1993 | Doi et al. | 395/417 |
| 5,265,235 | 11/1993 | Sindhu et al. | 395/447 |
| 5,297,269 | 3/1994 | Donaldson et al. | 395/472 |
| 5,303,362 | 4/1994 | Butts, Jr. et al. | 395/448 |
| 5,319,753 | 6/1994 | MacKenna et al. | 395/868 |
| 5,319,766 | 6/1994 | Thaller et al. | 395/473 |
| 5,375,220 | 12/1994 | Ishikawa | 395/468 |
| 5,392,416 | 2/1995 | Doi et al. | 395/403 |
| 5,428,799 | 6/1995 | Woods et al. | 395/739 |
| 5,553,266 | 9/1996 | Metzger et al. | 395/471 |
| 5,598,550 | 1/1997 | Shen et al. | 395/473 |
| 5,603,005 | 2/1997 | Bauman et al. | 395/451 |

SYSTEM LEVEL MECHANISM FOR INVALIDATING DATA STORED IN THE EXTERNAL CACHE OF A PROCESSOR IN A COMPUTER SYSTEM

This is a continuation of application Ser. No. 08/414,365 filed Mar. 31, 1995 now abandoned.

BACKGROUND OF THE INVENTION

1. Field of the Invention

The present invention pertains to the field of computer systems. More particularly, this invention relates to a computer system that includes a system level mechanism for invalidating data stored in the external cache of a processor in the computer system.

2. Background

Prior computer systems typically include one or more processor subsystems and one or more input/output subsystems coupled to a main memory subsystem. Such a main memory subsystem typically provides storage areas for instructions and data for the processors, as well as storage areas for data transfer to and from input/output devices coupled to the input/output subsystem. Typically, the processor subsystems and the input/output subsystems are coupled to the main memory subsystem via a physical interconnect that provides a common bus or a switched interconnect data path.

A processor subsystem in such a system typically includes an associated external cache memory. Such an external cache memory usually stores selected blocks from the main memory subsystem. An external cache memory usually provides fast processor access to code and data by avoiding external fetches to the main memory subsystem for datablocks that are stored in the cache. In addition, such a computer system typically implements a protocol for maintaining data coherency between the main memory and the corresponding datablocks in the external cache memory. For example, each external cache memory typically includes a set of tags that indicate the validity status of the datablocks stored in the external cache.

Typically, such a computer system provides a mechanism for performing coherent data input/output. For example, an input/output subsystem in such a computer system commonly injects new data into the system by issuing write invalidate (WRI) operations to the main memory subsystem. Such write invalidate operations may occur, for example, when a new page of data is read from a disk device coupled to the input/output subsystem.

In addition, a processor subsystem commonly injects new data into the computer system using WRI operations during block copy operations. Such block copy operations occur, for example, during data structure initialization or during file copy operations in the computer system. Such block copy operations occur at a relatively high rate in a typical prior computer system.

Such WRI operations usually require the invalidation of corresponding data blocks stored in an external processor cache to maintain data coherency in the system. Typically, such an invalidate operation on an external cache is only necessary when the tags for that external cache indicate that the newly injected datablock is present.

In some prior computer systems, such an invalidation operation is performed within each processor subsystem. In such a system, a processor reads the corresponding external tags to determine whether an invalidate operation is required during a write invalidate transaction. However, such a mechanism requires that each processor perform a tag read operation and potentially a tag read-modify-write operation for each WRI operation issued to the memory subsystem. Such WRI operations occur at a frequent rate in typical prior systems and interfere with normal instruction execution by the processors, thereby slowing the overall performance of such a system. Moreover, processor subsystems that perform such self-invalidation operations may be incompatible with systems that provide directory based tags in the memory subsystem.

Some computer systems may implement a worst case approach to such invalidate operations. For example, a system may blindly perform an external cache invalidate operation for every write invalidate transaction whether or not the datablock specified by the write invalidate transaction is present in the external cache. Such an invalidate operation is unnecessary whenever the specified datablock is not stored in the external cache. Unfortunately, such unnecessary invalidate operations interfere with normal operations of the processor.

In addition, such invalidate operations may be required during some types block copy operations while not during other types of block copy operations. For example, a processor subsystem may require an invalidate operation during block copy operations that generate new memory datablocks that the processor subsystem will not later access. On the other hand, block copy operations that write datablocks to stable storage in the computer system typically do not require an invalidate operation to the external cache if the processor retains control over the datablocks transferred to stable storage. Prior systems that blindly perform invalidate operations usually cause the processor subsystem to later perform an external fetch to the memory subsystem for the specified datablocks. Unfortunately, such unnecessary external fetches to the memory subsystem slows the overall throughput of such a computer system.

SUMMARY OF THE INVENTION

A computer system is disclosed including a memory subsystem and a processor subsystem having an external cache wherein the memory subsystem includes a mechanism for invalidating datablocks in the external cache. The computer system also includes a mechanism for reducing false invalidation operations by providing hints to the memory subsystem of the state of data in the external cache.

The processor subsystem issues a write invalidate message to the memory subsystem that specifies a datablock and that includes an invalidate advisory indication. The invalidate advisory indication indicates whether the datablock is present in the external cache. The invalidate advisory indication determines whether the memory subsystem transfers an invalidate message to the processor subsystem that invalidates the datablock in the external cache.

The mechanism in the memory subsystem for invalidating the external cache of the processor simplifies the design of the processor to external cache interface and reduces the impact on processor performance of write invalidate operations in the system. Such an external mechanism for cache invalidation also eliminates read-modify-write operations by the processor to the external cache during write invalidate operations that would otherwise impact processor performance. In addition, such an external mechanism for cache invalidation provides a processor subsystem that is compatible with multiprocessor systems that maintain directory based or duplicate tags and with uniprocessor systems that do not maintain directory based or duplicate tags.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
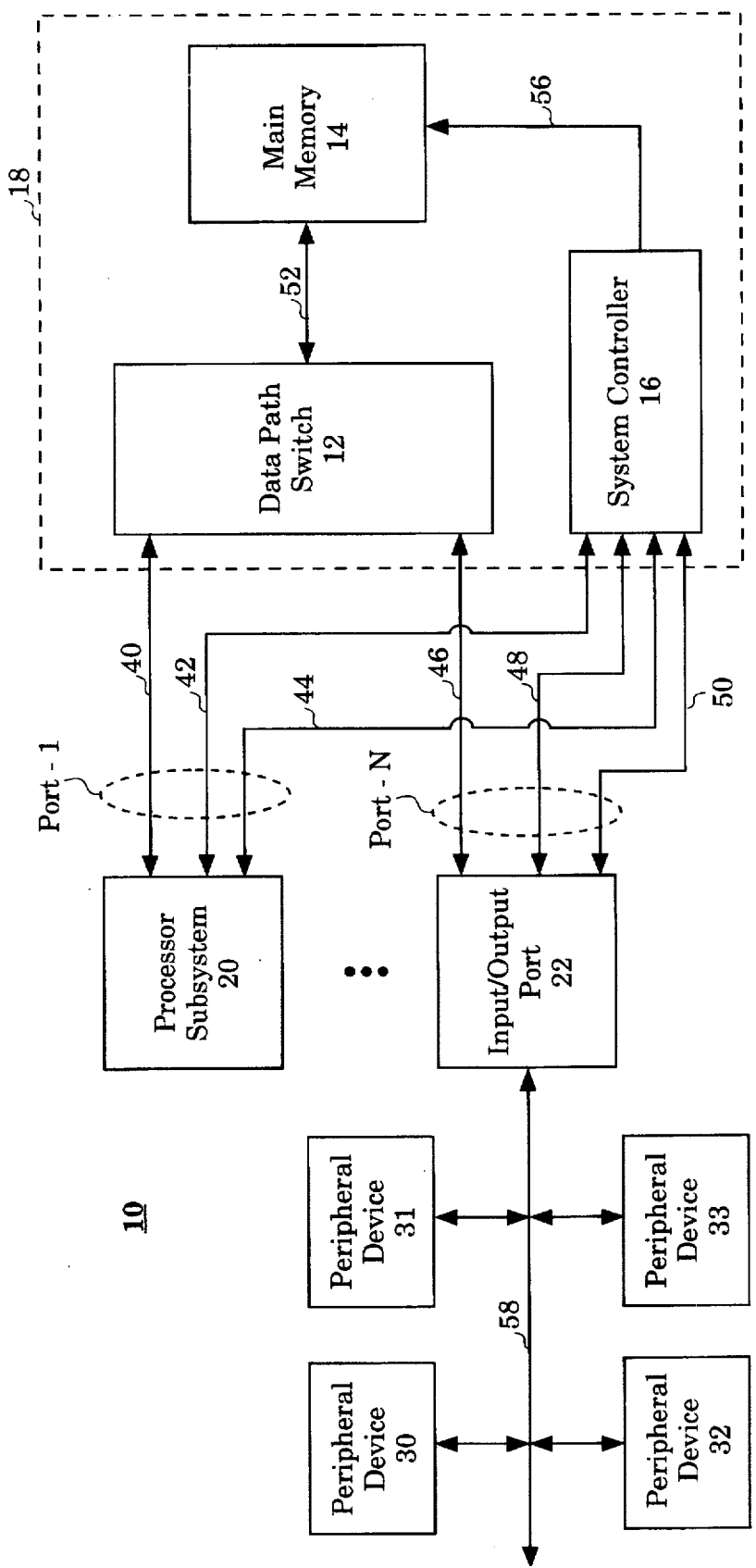
FIG. 1 illustrates a computer system 10 for one embodiment including a processor subsystem, an input/output port, and a memory interconnect subsystem.

FIG. 1 illustrates a computer system 10 for one embodiment. The computer system 10 comprises a processor subsystem 20, and an input/output port 22, and a memory interconnect subsystem 18. The memory interconnect subsystem 18 provides shared access to a main memory 14 to the processor subsystem 20 and the input/output subsystem 22. Elements of the computer system 10 communicate with the memory interconnect subsystem 18 via a set of memory ports 1-N. For example, port 1 for the processor subsystem 20 comprises a data path 40, an address path 42, and a control path 44, and port N for the input/output subsystem 22 comprises a data path 46, an address path 48 and a control path 50.

The memory interconnect subsystem 18 includes a data path switch 12 to the main memory 14, and a system controller 16. For one embodiment, the data path switch 12 is a cross bar switch controlled by the system controller 16 via a set of control signals 54. The data path switch 12 enables data path access to the main memory 14 via the data path of each port 1-N including the data path 40 and the data path 46. The system controller 16 functions as a memory controller by decoding the addresses received from the processor subsystems 20–22 and by generating memory control signals including row address select (RAS) and column address select (CAS) signals to the main memory 14 via a memory control bus 56.

The system controller 16 receives memory access requests from the subsystems 20–22 via the address path of each port 1-N including the address path 42 and the address path 48. The system controller 16 arbitrates among the requests from the subsystems 20–22 and configures the data path switch 12 to provide the necessary connections for access to the main memory 14 via a memory data bus 52 or for subsystem to subsystem data transfers. The system controller 16 responds with cache state transition control messages to the processor subsystem 20 when necessary.

The memory access requests include, for example, write invalidate (WRI) requests. The subsystems 20–22 use a WRI request to the system controller 16 to write a specified datablock into the main memory 14. The system controller 16 processes a WRI request by configuring the data path switch 12 to provide the proper source for the specified datablock. If the WRI request originates with the processor subsystem 20, then the system controller 16 transfers messages via the control path 44 to control the cache state transitions in the external cache of the processor subsystem 20. For example, the system controller 16 transfers invalidate messages via the control path 44 to invalidate datablocks in the external cache of the processor subsystem 20 when appropriate.

In another embodiment, the system controller 16 maintains a set of duplicate tags that correspond to the external tags. In such a multiprocessor embodiment, the system controller 16 accesses the duplicate tags via a snoop bus coupled between the system controller 16 and the duplicate tags. For an illustration of such an embodiment, refer to application Ser. No. 08/423,016, filed Mar. 31, 1995, and entitled Cache Coherent Computer System that Minimizes Invalidation and Copyback Operations.

The input/output port 22 enables communication with a set of peripheral devices 30–33 via a standardized input/output bus 58. The standardized input/output bus 58 may comprise, for example, a SBUS or a peripheral component interconnect (PCI) standardized bus. The input/output port 22 implements a direct memory access mechanism that provides coherent input/output operations to the main memory 14 through the system controller 16.

Figure 2:
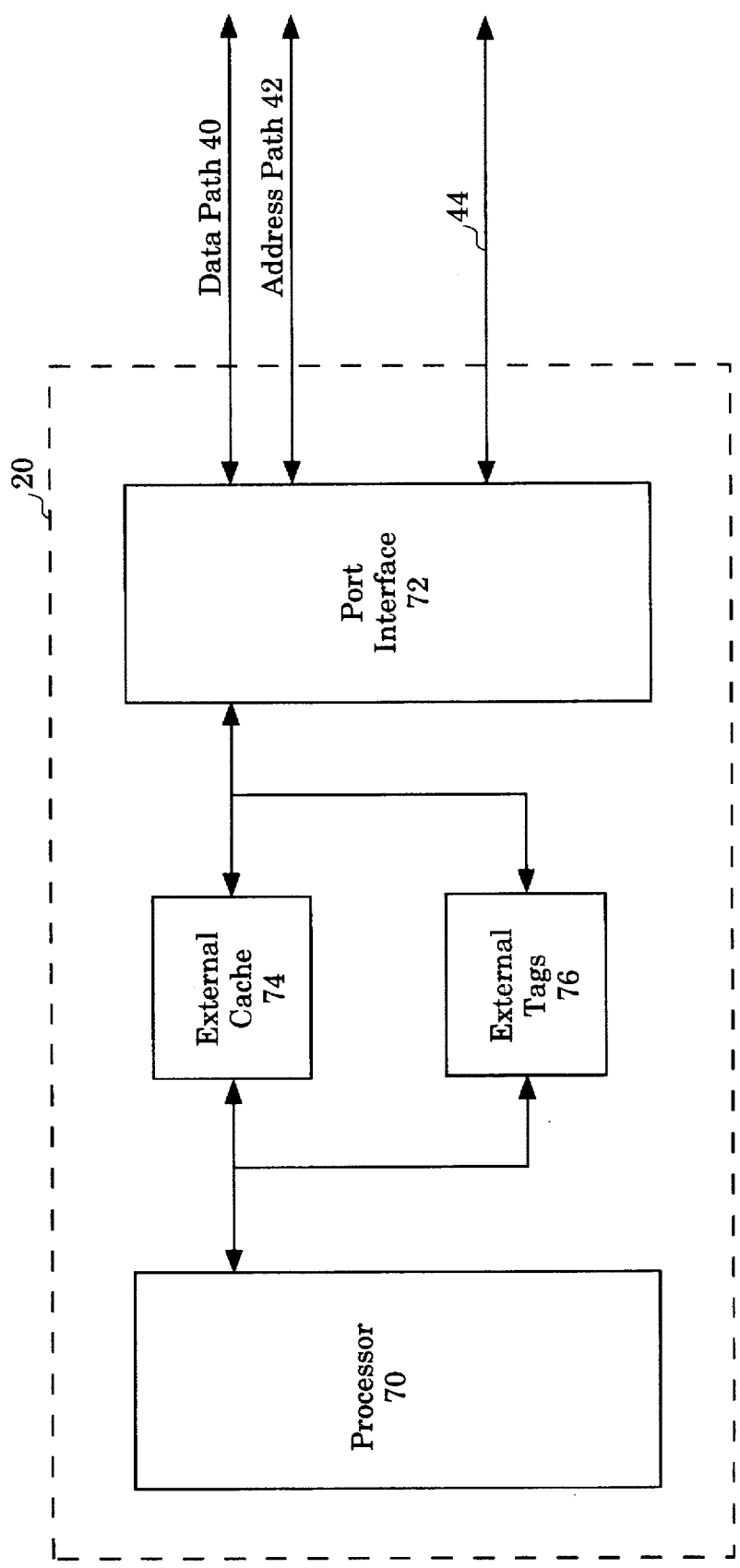
FIG. 2 illustrates a processor subsystem which includes a processor, an external cache and associated set of external tags, and a memory interconnect port interface.

FIG. 2 illustrates the processor subsystem 20 for one embodiment. The processor subsystem 20 comprises a processor 70, an external cache 74, and an associated set of external tags 76 along with a port interface 72.

The processor 70 issues memory load and memory store operations to the external cache 74. The port interface 72 issues cache requests to the system controller 16 using a message packet transferred via the address pass 42. The cache requests include WRI transactions during block copy operations by the processor 70. Each message packet transferred via the address pass 42 includes a header that specifies the write invalidate request type along with an address that specifies the datablock for the write invalidate transaction. The system controller 16 processes a write invalidate transaction by configuring the datapath switch 12 to transfer the corresponding datablock to the main memory 14.

For one embodiment, the WRI request packet to the system controller 16 includes an invalidate advisory (IVA) indication. The IVA indication determines whether the system controller 16 issues an invalidate request back to the processor subsystem 20 to invalidate the corresponding datablock in the external cache 74. In addition, the processor subsystem 20 performs a copyback operation to the memory interconnect subsystem 18 in response to the invalidate request if the specified invalidated datablock is present in the external cache 74.

Figure 3:
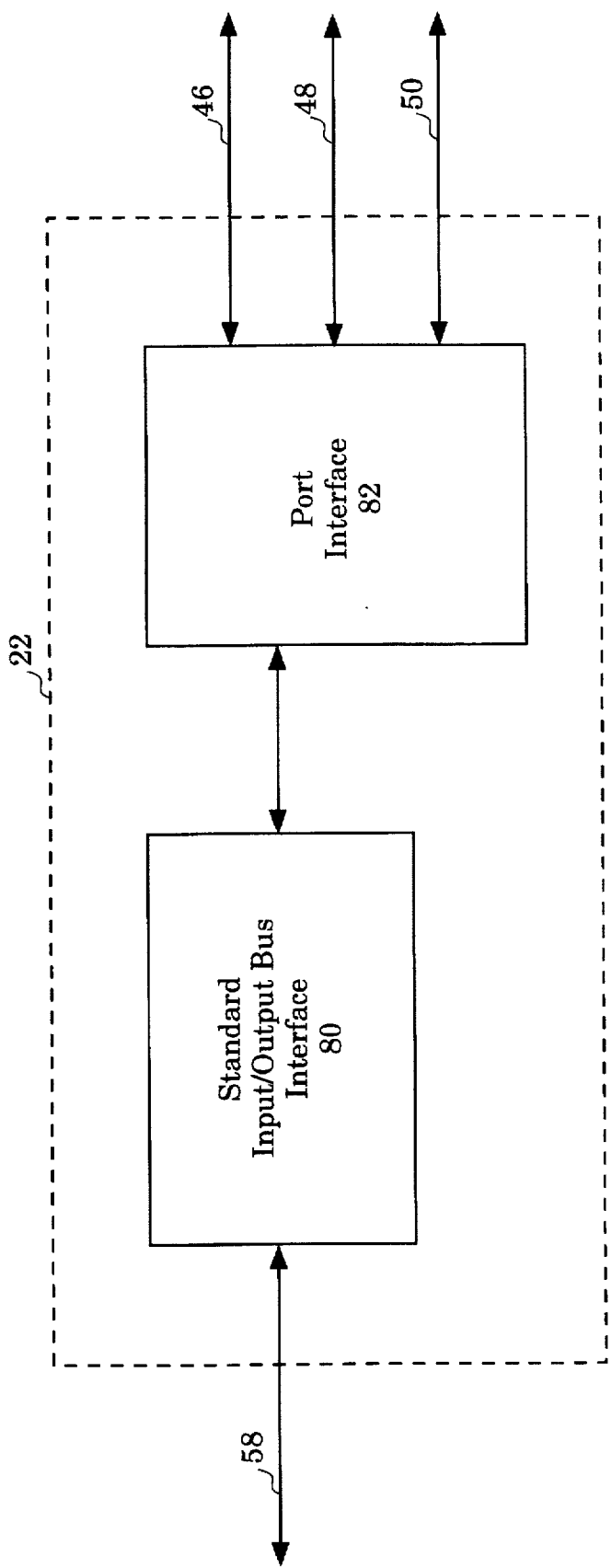
FIG. 3 illustrates the input/output port for one embodiment including a standard input/output bus interface and a port interface that enables coherent input/output direct memory access to the main memory.
Figure 4:
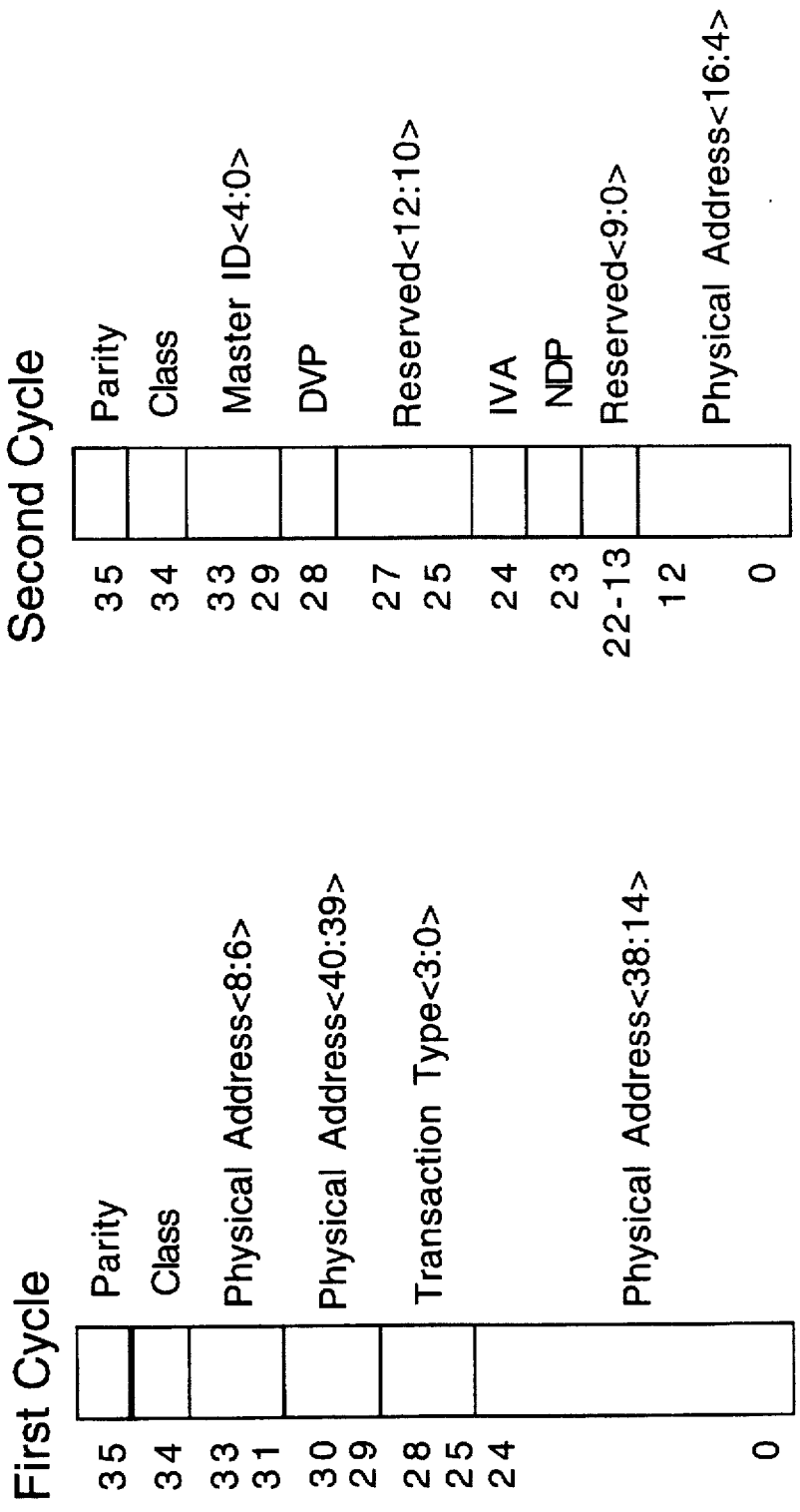
FIGS. 4a and 4b illustrates one embodiment of a request packet from one of the memory ports Port 1–Port N to the system controller.

FIG. 3 illustrates the input/output port 22 for one embodiment. The input/output port 22 comprises a standard input/output bus interface 80 along with a port interface 82. The port interface 82 enables coherent input/output direct memory access to the main memory 14 through the system controller 16. FIGS 4a and 4b illustrates one embodiment of a request packet from one of the memory ports Port 1–Port N to the system controller 16. For this embodiment, the request packet is transferred in two cycles via the appropriate memory path to the system controller 16. The physical address of the request packet specifies a datablock of the main memory 14 for the request packet. During a WRI transaction from the processor subsystem 20, the transaction type field of the first cycle of the request packet indicates the write invalidate transaction type. The IVA bit indicates whether the processor subsystem 20 requires an invalidate request for the corresponding write invalidate transaction to invalidate the datablock in the external cache 74 and tags 76.

Figure 5:
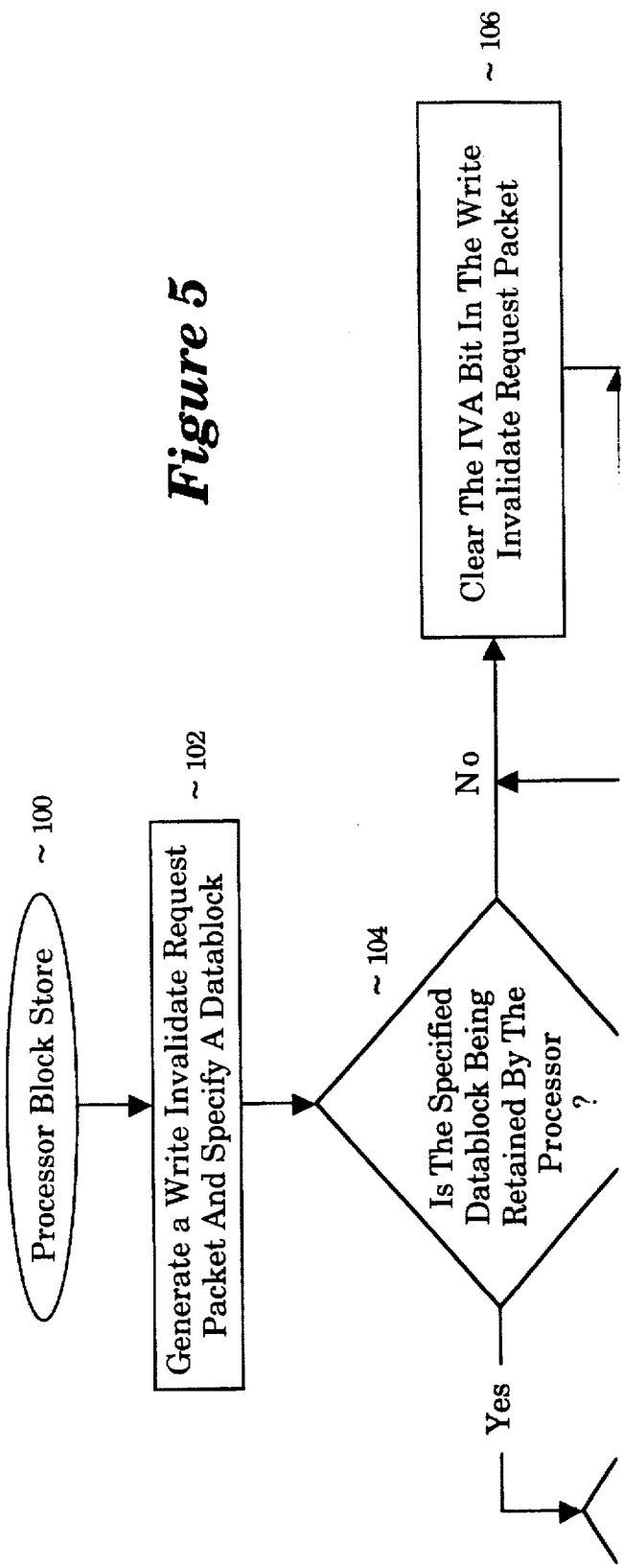
FIG. 5 illustrates the handling of a block store operation by the processor subsystem for one embodiment.
Figure 5:
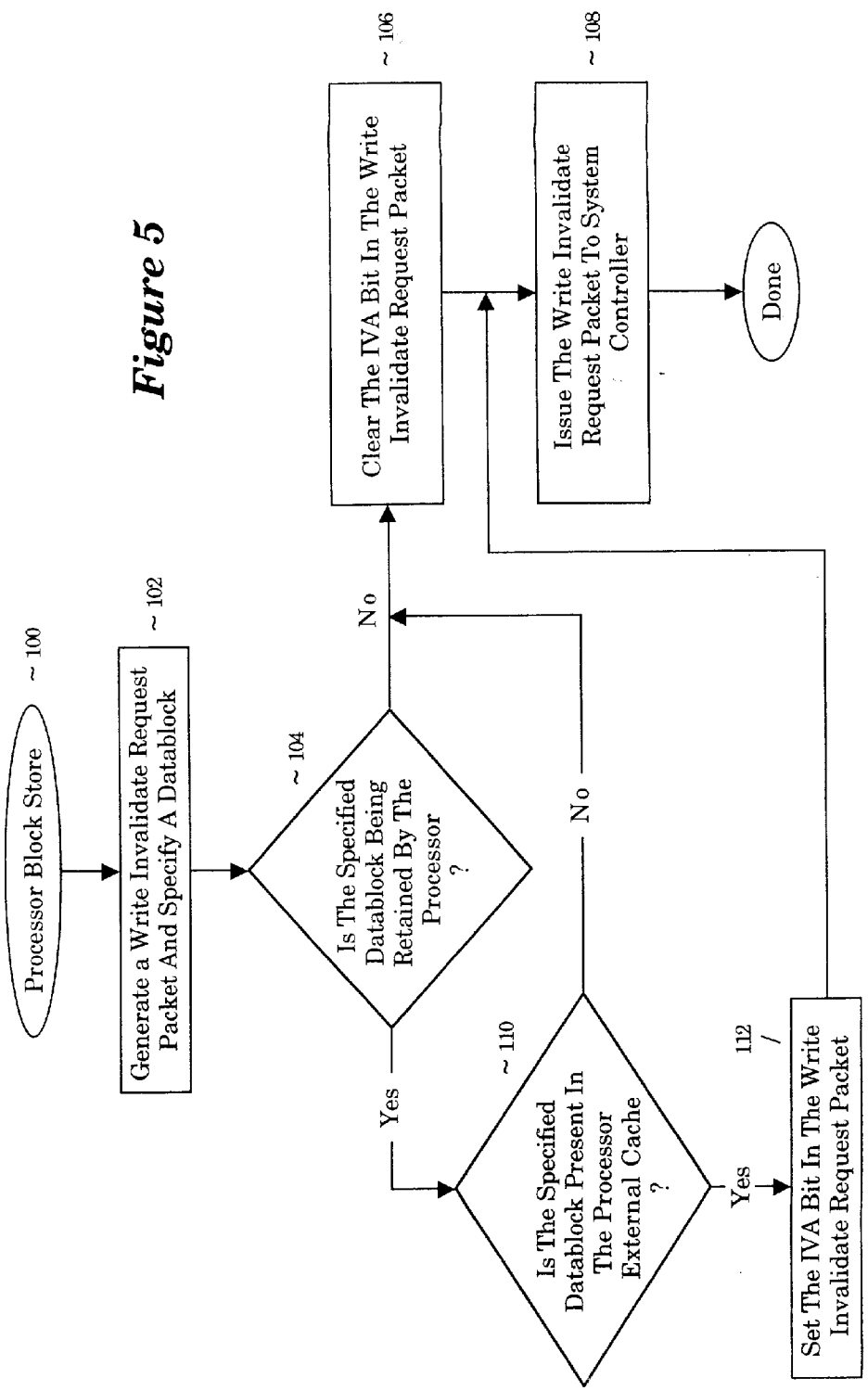

FIG. 5 illustrates a block store operation by the processor subsystem 20 for one embodiment. The block store operation may occur, for example, during a block copy by the processor subsystem 20. At block 100, the processor 70 issues a block store operation to the external cache 74.

At block 102 the port interface 72 generates a write invalidate request packet that specifies the datablock of the block store operation from the processor 70. At decision block 104, the processor 70 determines whether the specified datablock is being retained. If the specified datablock is not being retained by the processor 70 at decision block 104, then control proceeds to block 106.

At block 106, the processor 70 clears the IVA bit in the write invalidate request packet assembled in the port interface 72. Thereafter, at block 108 the port interface 72 issues the write invalidate request to the system controller 16 via the address path 42.

If the specified datablock is being retained by the processor 70 at decision block 104, then control proceeds to decision block 110. At decision block 110, the processor 70 determines whether the specified datablock is present in the external cache 74 by performing a tag look-up operation to the external tags 76. If the specified datablock is not present in the external cache 74, then control proceeds to block 106, where the processor 70 clears the IVA bit in the write invalidate request packet assembled in the port interface 72. Thereafter, at block 108, the port interface 72 issues the write invalidate request to the system controller 16. Otherwise control proceeds to block 112.

At block 112 the processor 70 sets the IVA bit in the write invalidate request packet to indicate that a write invalidate request for the datablock is required from the system controller 16. Thereafter, control proceeds to block 108 to issue the write invalidate request packet to the system controller 16.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer system comprising:

processor subsystem having an external cache memory; and memory subsystem coupled to the processor subsystem, the memory subsystem being separate from the processor subsystem, the processor subsystem issuing a write invalidate (WRI) operation specifying a data block to be stored in the memory subsystem, the WRI operation including an invalidate advisory (IVA) indication that indicates to the memory subsystem whether the data block is present in the external cache, the IVA indication determining whether the memory subsystem, in response to receiving the WRI operation, sends a message to the processor subsystem to invalidate the data block.

2. The computer system of claim 1 further comprising: I/O subsystem coupled to the memory subsystem, the data block originating from the I/O subsystem.

3. The computer system of claim 1 wherein the IVA indication is a single bit, the bit being set to indicate the data block is present in the external cache, the memory subsystem sending the message to invalidate the data block in response to detecting the bit as set.

4. The computer system of claim 1 further comprising:

a plurality of cache tags associated with the external cache memory, the processor subsystem performing a cache tag look-up operation to determine whether the data block is present in the external cache.

5. A computer system comprising:

processor subsystem having an external cache memory and associated cache tags; and memory interconnect including a mechanism for invalidating a data block in the external cache memory, the memory interconnect further being separate from the processor subsystem, wherein the memory interconnect invalidates the data block in response to an invalidate advisory (IVA) indication included in a write invalidate (WRI) operation issued by the processor subsystem that specifies the data block.

6. The computer system of claim 5 further comprising:

a plurality of duplicate tags maintained by the memory interconnect, the duplicate tags corresponding to the cache tags in the processor subsystem.

7. A method for transferring data to a memory interconnect, the memory interconnect being separate from but coupled to a processor subsystem, the processor subsystem including an external cache memory, the method comprising the steps of:

determining whether a data block is present in the external cache memory;

issuing a write invalidate (WRI) operation specifying the data block to be stored in the memory interconnect, the WRI operation further including an invalidate advisory (IVA) indication that indicates to the memory interconnect whether the data block is present in the external cache memory; and invalidating the data block in response to detecting the IVA indication.

8. The method of claim 7 wherein the step of issuing a WRI operation includes specifying a data block that originates from an I/O subsystem coupled to the memory interconnect.

9. The method of claim 7 wherein the step of determining whether a data block is present in the external cache memory includes the step of performing a cache tag look-up operation.

* * * * *

UNITED STATES PATENT AND TRADEMARK OFFICE
CERTIFICATE OF CORRECTION

PATENT NO. : 5,737,755
DATED : April 7, 1998
INVENTOR(S) : Ebrahim et al.

It is certified that error appears in the above-identified patent and that said Letters Patent is hereby corrected as shown below:

Drawings,
Figure 5, please delete the incomplete sketch of Figure 5 and insert the attached figure.

Column 3,
Line 21, please delete "illustrates" and insert -- illustrate --.

Column 4,
Line 61, please begin a new paragraph with "Figs. 4a and 4b".

Signed and Sealed this

Twenty-second Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.    : 5,737,755                                          Page 1 of 1
DATED         : April 7, 1998
INVENTOR(S)   : Ebrahim et al.

It is certified that error appears in the above-identified patent and that said Letters Patent is hereby corrected as shown below:

Drawings,
Figure 5, please delete the incomplete sketch of Figure 5 and insert the attached figure.

Column 3,
Line 21, please delete "illustrates" and insert -- illustrate --.

Column 4,
Line 61, please begin a new paragraph with -- Figs. 4a and 4b --.

Signed and Sealed this

Twenty-ninth Day of October, 2002

Attest:

Attesting Officer

JAMES E. ROGAN
Director of the United States Patent and Trademark Office